United States Patent
Ederlöv et al.

(10) Patent No.: US 6,369,574 B1
(45) Date of Patent: Apr. 9, 2002

(54) METHOD OF PROBING DRILL HOLES ELECTROMAGNETICALLY, AND A TRANSMITTER ARRANGEMENT AND A RECEIVER ARRANGEMENT FOR CARRYING OUT THE METHOD

(75) Inventors: Per Ederlöv, Skellefteå ; Östen Lindqvist, Boliden; Per Nilsson, Skellefteå ; Robert Pantze, Boliden; Henrik Sundén, Boliden; Jan Wikberg, Boliden; Lennart Wikman, Skellefteå, all of (SE)

(73) Assignee: Boliden Mineral AB (SE)

( * ) Notice: Subject to any disclaimer, the term of this patent is extended or adjusted under 35 U.S.C. 154(b) by 0 days.

(21) Appl. No.: 09/284,268

(22) PCT Filed: Sep. 21, 1998

(86) PCT No.: PCT/SE98/01683

§ 371 Date: Apr. 12, 1999

§ 102(e) Date: Apr. 12, 1999

(87) PCT Pub. No.: WO99/15916

PCT Pub. Date: Apr. 1, 1996

(30) Foreign Application Priority Data

Sep. 23, 1997 (SE) ................................ 9703429

(51) Int. Cl.⁷ ............................. G01V 3/24; G01V 3/28
(52) U.S. Cl. ..................................................... 324/339
(58) Field of Search ....................... 324/339, 334–338, 324/340–344, 346, 359, 368; 340/853.1; 73/152.02; 175/40, 45, 50

(56) References Cited

U.S. PATENT DOCUMENTS

| 4,502,010 A | 2/1985 | Kuckes |
| 4,901,023 A | 2/1990 | Vail, III |
| 5,208,539 A | * 5/1993 | Holmqvist et al. ......... 324/334 |
| 5,652,519 A | 7/1997 | Warren et al. |

FOREIGN PATENT DOCUMENTS

EP 780705 6/1997

\* cited by examiner

*Primary Examiner*—Jay Patidar
(74) *Attorney, Agent, or Firm*—Burns, Doane, Swecker & Mathis, L.L.P.

(57) ABSTRACT

A transmitter for probing drill holes includes a ground-located conductor loop (1) which is supplied with a current that has a wave shape which includes at least one low frequency (e.g., 200–3000 Hz). The frequency is crystal controlled and normalized to time signals from GPS satellites. A receiver includes coils which function to sense field changes having the same frequencies as the transmitter and is housed in a probe (6). The probe is lowered with the aid of a typical drill pipe (5) and lacks signal connection with the transmitter. Instead, the probe includes an accurate quartz clock which is frequently calibrated and which enables the phase of the received signal to be determined synthetically relative to the phase of the transmitter signal, e.g., by means of a signal processor.

16 Claims, 1 Drawing Sheet

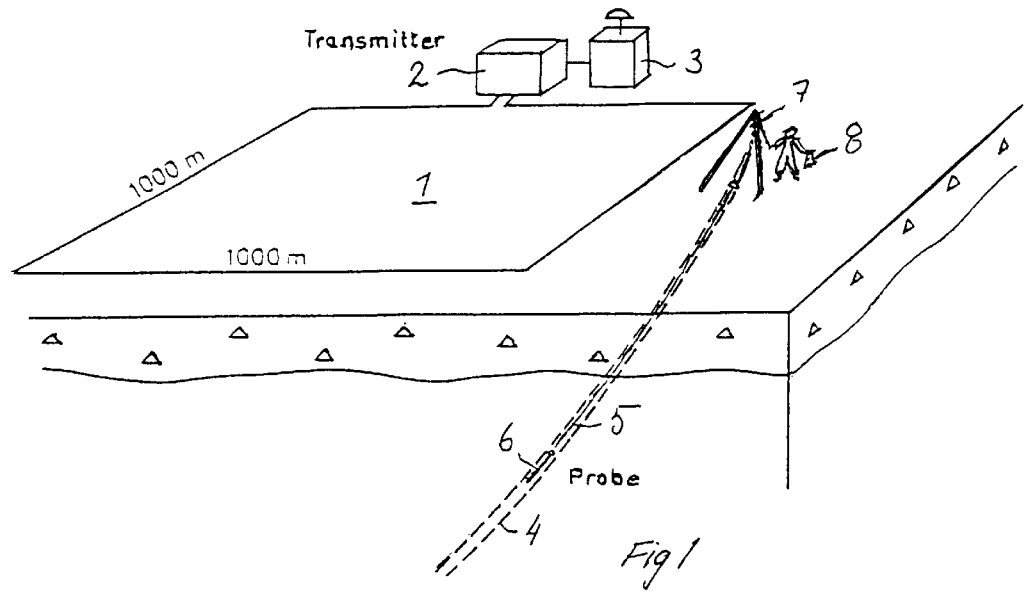
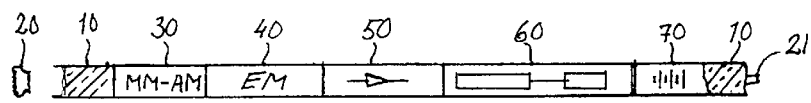
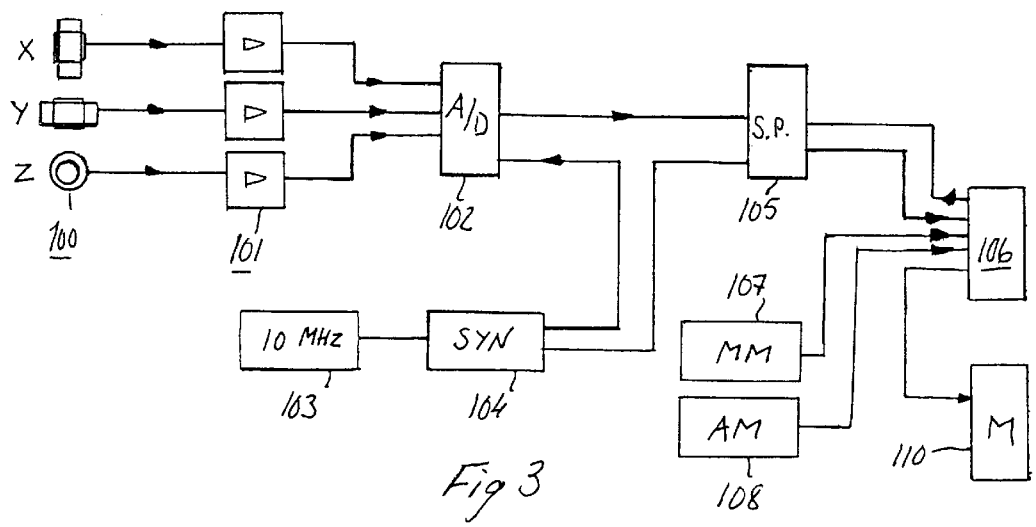

METHOD OF PROBING DRILL HOLES ELECTROMAGNETICALLY, AND A TRANSMITTER ARRANGEMENT AND A RECEIVER ARRANGEMENT FOR CARRYING OUT THE METHOD

FIELD OF THE INVENTION

The invention relates to a method and to a transmitter arrangement and a receiver arrangement for probing drill holes.

BACKGROUND OF THE INVENTION

Such a method and arrangements for carrying out the method for probing drill holes are known from EP-C-0 494 130. A theoretical exposition of the general measuring method is given in the Geological Survey of Canada Paper 85-27 (Toronto 1986), pp. 79–88, by Pantze et al.

Briefly, such methods involve passing a low-frequency alternating current from a transmitter unit through a ground carried loop whose magnetic field magnetises underlying minerals or generates induction currents therein. A receiver carried by a probe in a drill hole determines direction, amplitude and phase in respect of the sum of the primary and secondary induced magnetic fields that have the same frequency as the loop current.

In all known systems (e.g. in addition to systems taught by EP patents GB-A-1 467 943, and GB-A-2 148 012) detection is effected in one way or another phase locked to the frequency of the transmitter, wherewith the signal delivered by the probe is collected through an electric cable. Such systems have several drawbacks. All is well provided that the drill holes are stable and steep. However, the rock is often so weak as to risk a cable-suspended probe getting jammed in the hole. It is also difficult to force a probe down into a drill hole against any relatively firm resistance, for instance in the case of very flat or superficial holes or when the holes even extend upwards or are filled with sludge.

SUMMARY OF THE INVENTION

An object of the present invention is to provide a drill hole measuring system of the aforesaid kind with which the drawbacks associated with cable suspended probes are eliminated. Another object is to provide a system which is more robust mechanically, which can be applied more simply, and with which actual sampling can be handled by drilling personnel that have a modicum of training, while allowing the data collected to be evaluated by prospecting experts under laboratory conditions.

These and other objects of the invention and advantages afforded thereby are realized by means of a method and a transmitter arrangement and a receiver arrangement of the aforesaid kind that have the special characteristic features set forth in respective independent claims, as will be apparent from the following description. Further advantageous embodiments of the invention will be apparent from the dependent claims.

Because there is no longer any electric connection between the transmitter and the receiver when practicing the present invention, it is necessary to measure time accurately. With respect to the transmitter, there can be used very precise time standards transmitted in radio connections. Although precision transmissions occur as terrestrial radio signals that derive from atomic clocks, the use of GNSS signals (acronym for Global Navigation Satellite System), e.g. belonging to the GPS system is preferred at present.

In accordance with one advantageous embodiment of the invention, orientation of the probe in relation to the vertical is determined with the aid of a series of accelerometers instead of a gimbal and pendulum as in the case of known techniques, said accelerometers determining the direction of the vertical in relation to three Cartesian co-ordinate axes of the probe, each of said axes being defined by a respective accelerometer.

According to another advantageous embodiment of the invention, the probe is supplemented with a magnetic three-component sensor (flux gate) which measures the terrestrial magnetic field. Because the terrestrial magnetic field has a direction that differs from the vertical, it is possible to fully determine the position of alignment of the probe from this measurement in combination with the measuring result obtained with the accelerometers.

By registering the local terrestrial magnetic field at the same time, it is possible to interpret the local magnetic susceptibility in the rock and to judge where the terrestrial magnetic field is so undisturbed by local anomalies as to enable it to be used to accurately determine direction in relation to geographic north.

The strength of the primary field can also be measured by the magnetometer, by sending a constant direct current in the transmitter loop over a period of some seconds. (The duration of this current is adapted to the conductivity of the rock under investigation.) The primary field is determined directly, by measuring the magnetic field with the magnetic sensors with and without said direct current, regardless of electrical conductors in the bedrock. Since the magnetometer sensors are not sensitive to alternating current fields, the AC-field may be constantly present. A change of 10 nT is obtained in the field with some tens of amperes in the loop, in the case of normal transmitter lay-outs and drill hole depths.

The probe will conveniently be compatible with the modularized, connectable pipe sections (the drilling rod) used in the actual drilling operation and will thus include the same type of connector as said sections and the drill bit attached to the rod. When drilling of a hole is completed, the drilling bit is lifted up and the pipe sections successively dismantled. A drill bit may optionally be fastened to the bottom part of the probe and the pipe sections fitted together exactly as while drilling. The presence of a drill bit at the end of the probe avoids the probe becoming jammed and lost, this risk being far less than in the case of a line-suspended probe. Weak zones can be "drilled" through in particular, since the probe is able to withstand such drilling action under such circumstances. Because the probe is attached to a drilling rod, it can be moved down into oblique drill holes and even in horizontal or upwardly sloping parts of a drill hole.

When lowering the probe, the foreman will note on a keypad belonging to the transmitter part, or on a separate hand-held unit, the instants at which the drill rod joints enter the drill hole, these notations then being used in the evaluation process. The probe is suitably allowed to carry out registrations at regular time intervals, e.g. every fifteen seconds. This can then be combined with the probe-lowering protocol. The measurements are suitably repeated at the same locations or positions when lifting up the probe.

In accordance with one preferred embodiment of the invention, the operating personnel have a hand-held computer which includes a clock function in which time and depth are stored. A suitable distance along the drill hole between said measuring points may be 3 m, corresponding to the length between the joints in the drill pipe. Upon completion of the measuring process and return of the probe to the surface, the probe and the hand-held computer are connected and caused to communicate with one another, wherewith the computer calls the probe for each registered time point with depth and receives the recorded values at this time point, such that all data will be stored in the computer and later sent for processing.

It is suitable to read into the probe memory all available data at regular time intervals, e.g. every fifteen seconds, so as to ensure that at least one measurement for each level can be fed into the computer.

This simple procedure, involving and utilizing the same equipment as that used for drilling purposes, enables the measuring operation to be carried out as a matter of routine by the same personnel as those drilling the hole. Traveling time for special personnel can be saved by laying-out the transmitter loop beforehand (perhaps for use with several drill holes) and drill holes that are completed at night-time can be measured with the minimum of time loss.

BRIEF DESCRIPTION OF THE DRAWING

The invention will now be described in more detail with reference to a non-limiting embodiment thereof and also with reference to the accompanying drawing, in which FIG. 1 illustrates schematically measuring equipment, including a ground loop and a probe inserted into a drill hole;

FIG. 2 is a cross-sectional view showing the general configuration of a probe; and FIG. 3 is a block schematic that illustrates one example of an electronic circuit for a probe according to the invention.

DETAILED DESCRIPTION OF ONE EMBODIMENT

Shown in FIG. 1 is a transmitter loop 1 which is supplied from a transmitter/current source 2 with an alternating current that has an effective value of about 3A. The alternating current has two frequencies, in the illustrated case frequencies of 2380 Hz and 239 Hz. The frequencies are chosen to have the minimum disturbance on the main frequency (60 Hz) that can occur when investigations are carried out, e.g., in a mining environment close to high voltage lines or in populated areas. These frequencies are crystal-controlled and normalized to those pulses of one second interval that are obtained from a typical commercial GPS receiver 3 with its symbolically illustrated antenna. These pulses are obtained with a time jitter of about 130 ns (rms), without any particular measures being taken. As the skilled person is well aware, stability can be improved by a factor of 2.6, by locking the geographical coordinates. However, it can be insured that the error will be at most 390 ns (3 $\sigma$), corresponding in turn to a primary current phase shift of 1/30° at 238 Hz and 1/3° at 2380 Hz, during a three-hour measuring process (10,000 s) without taking such measures.

A probe 6 attached to a drilling pipe 5 is located in a drill hole 4. Because the current in the loop 1 generates a varying field, there is induced in the conductive regions of the ground electric currents which manifest themselves in the form of magnetic fields. The probe is lowered successively down into the hole, by adding pipe sections to the schematically illustrated drill equipment 7 and therewith extend the drill pipe. As this takes place, a foreman notes on a hand-held computer 8 the occasion of fitting each new extension, therewith entering successive time-point notations in the computer. Corresponding measurements are taken at the same positions when lifting up the probe, during which said extensions are successively removed.

FIG. 2 is a schematic illustration of the probe 6, although not to scale. The probe will normally have a length of about 2 m and a diameter that will enable the probe to be passed down a 40 mm drill hole. The probe 6 includes an outer tube and an inner tube (not shown) positioned within the outer tube and disposed between two symbolically illustrated shock absorbers 10 which function to dampen both axially and radially acting impact forces.

Seated in a first section or space 30 is a combined magnetometer and accelerometer (MM-AM), which in the illustrated case is of the type Model 544 Miniature Angular Orientation Sensor from Applied Physics Systems. This sensor includes a fluxgate magnetometer and an accelerometer, each having three axes, and a microprocessor, and thus delivers values related to the direction of gravity (3 values) and the direction of the terrestrial magnetic field (3 values) in respect of the probe. Since the direction of the terrestrial magnetic field is generally known, at least in the absence of magnetic iron ore, these measurements provide a complete picture of the angular orientation of the probe.

Mounted in a second sector 40 are three mutually perpendicular coils with which the magnetic field generated by the coil 1 (FIG. 1) is determined (actually the time derivative of the magnetic field), wherewith the signals are amplified, processed and entered into an electronic memory (RAM) in the sectors 50 and 60. The electronics are powered by an electric battery accommodated in the sector 70.

Provided at one end is a device for the attachment of a drill bit 20, while the other end of the probe includes drill-pipe connection means (not shown) and an electronic contact 21 which is used to synchronize clocks in the hand-held computer and in the probe control equipment respectively prior to each measuring process, and for connecting the computer 8 upon completion of the measuring process so as to dump the contents of the memory in the electronics (FIG. 1). According to one preferred embodiment, this takes place selectively while controlling the computer to dump the measurement values solely at those instants when the probe is held stationary at a known depth in the drill hole, from above.

FIG. 3 is a block schematic that illustrates the component electronics. Three mutually perpendicular coils 100 wound with copper wire on ferrite cores are each coupled to a respective amplifier and filter circuit 101, which provides amplification of about 200,000 times and filters with pass-bands around the two mentioned transmission frequencies. A fast A/D converter 102 with a track/hold facility captures all channels simultaneously, for processing in a signal processor 105. As before mentioned, the probe also includes a magnetometer unit 107 and an accelerometer 108. The entire system is controlled by a control unit 106.

The actual calculations are controlled by coupling an accurate quartz time standard 103 (frequency 10 MHZ) placed in a thermostat-controlled environment to a synchronizing unit 104, which during the accurate time keeping of the time standard delivers two different pulse series whose frequencies are accurately adapted to the transmitter frequencies in the alternating current through the transmitter loop (FIG. 1). When the transmitter frequencies are chosen as 238 Hz and 2,380 Hz, pulses having a frequency of 30,464 Hz ($=238 \times 2^7$) are delivered to the A/D converter 102 and at the frequency of 14,875 Hz (238÷2⁴) to the signal processor 105. The A/D converter samples the three analogue signals x, y and z from the EM coils simultaneously at each 1/30,464 second and keeps the digital correspondences in respective memory registers until the next sampling occasion.

The control unit 106 includes a real time clock (which may be moderately precise) that calls the signal processor four times per minute, thus at fifteen-second intervals. The signal processor commences sampling of the three digital channels of the A/D converters at the nearest subsequent positive pulse edge in the 14,875 Hz pulse train. An accurate time-determined start of the sampling process is obtained in this way. Sampling takes place each 1/30,464 seconds over a period of slightly longer than six seconds, such that the total registration will include 16,000 periods of the 2,380 Hz signal and 1,600 periods of the 238 Hz signal. The sample values are added successively in 1024 registers for each of the three channels. Register No. 1 follows register No. 1024. These registers thus describe the signal as the sum of 200 measurements taken over a time period that is precisely equal to 8 periods of the 238 Hz signal.

After forming a mean value and subsequent Fast Fourier transformation of the values of the 1024 registers, there is obtained real and imaginary components for the eighth and eightieth harmonics of the fundamental frequency of the signal processor, this fundamental frequency being 29.75 Hz with selected sampling frequency and selected number of registers. The obtained values of real and imaginary components are corrected for a measured delay in the system with matrix multiplication. Real and imaginary components may be optionally converted to amplitude and phase.

The results (six values) together with the measurement values obtained from the magnetometer 107 (three values) and the accelerometer 108 (three values) are stored in the memory 110 together with the time instants from the real time clock in the control unit. At the beginning of the measurements the real time clock is synchronized with the clock of the hand-held computer.

The illustrated embodiment uses a typical programmed signal processor of the type TMS 320 C50 (Texas Instruments).

It will be understood that the signals of interest may be very weak, and consequently the least square resolution inherent in the Fourier method is often absolutely necessary in order to capture the signal amplitude and phase from the noise. (Detection limit down to 0.05 nT).

The environmentally controlled quartz oscillator 103 is of a commercially available kind, in the illustrated case an OCXO oscillator with a standard frequency nominally of 10 MHZ (Micro Crystal, Div. of ETA SA, Grenchen, Switzerland). The short time stability during 0.1–30 s is given as <5 E-10. The long time stability over the first year is given as <0.7 ppm and over ten years <4 ppm. Consequently, if the receiver is calibrated to a crystal that has the correct running speed (e.g. a GPS) each year, the clock will have an erroneous running speed of at most 0.7 μs per second. A long measuring process has a duration of about three hours, i.e. 10,000 seconds, and the clock will thus have an error of 7 ms at the end of such a long process. This corresponds to 1.66 periods at the lower frequency of 238 Hz, and a total of 16.6 periods in respect of the signal at 2380 Hz, which may be difficult to compensate for. It is therefore necessary to calibrate the crystal so that the running speed error is kept below about 2 periods during such a measuring process.

Such calibration is available through the GPS time, which consists of "exact" second pulses with the incorporated time ripple of 130 ns rms. The electronics shown in FIG. 3 are adapted to take data into the memory every fifteen seconds. When a comparison is made between these pulse series over a time of 150 seconds, there is obtained in principle a calibrating accuracy of 0.9 ppb. It is then possible to set the running speed with this accuracy, in that the clock circuit 103 can be adjusted via the hand-held computer (not shown in FIG. 3). During a measuring process of about three hours, a phase shift of up to 0.7° in respect of the 238 Hz signal and ten times more in respect of the higher frequency due to running speed error is obtained.

This calibration is thus achieved by coupling the probe to the hand-held computer and calibrating after a typical warm-up period (≈30 min.) and making adjustments, possibly in the following way. Because the transmitter loop 1 (FIG. 1) is supplied with respective period currents, the measurement values for X, Y, Z can be taken-in from the probe lying stationary on the ground. A discrepancy in the clock 103 in relation to the GPS time will manifest itself as a phase shift in the measurement values, which can be observed over an interval corresponding to a multiple of fifteen-seconds. This enables the run speed to be determined.

Adequate correction can be achieved in the valuation process, by determining this run frequently. The actual run speed can also be measured and a correction made for this part of the time discrepancy, by comparing the time with the GPS time signal, both before and after the measuring process.

The short-time stability of the clock is, on the other hand, highly significant. If it is assumed that this stability is proportional to the time over a period longer than thirty seconds, there will be obtained a maximum time jitter of 1.6 ms in respect of 10,000 seconds, which corresponds to 143° at 238 Hz. The sum of these calculated systematic errors is thus in the order of 145°. The magnitude of the discrepancy, or drift, can be examined, by comparing recordings taken at one and the same location while lowering and raising the probe, and a slightly higher discrepancy than the above calculated discrepancy has then been measured in practice. However, better calibration can actually be achieved when measuring at the same locations, both while raising and lowering the probe. It is recommended in particular that double-measurements are taken early in the drill hole in a stable place, in the absence of disturbances from casing pipes or machines. This procedure actually enables calibration to be made with more precision than when solely assuming a linear run, and at least make a second degree approximation of the oscillator drift, in certain cases also of higher orders.

In certain cases, attention can be paid to and corrections made in respect of the clock frequency with regard to temperature increases and pressure increases that occur at increasing depths. Both can be simulated in the laboratory.

It will be observed that these systematic errors relate to time errors, which are conventionally expressed in degrees, and not to any geometrical directional errors. The direction of the resultant magnetization measured in the measuring coils is determined by the relative amplitude of the three field components, each of which is measured by its respective coil.

The phase measurement in the electronics has a resolution of 1/3200 revolutions, i.e. 1/90 degrees. When the clock works correctly, the accuracy is judged to be 1/10 degrees in respect of 2,380 Hz. The accuracy is better in respect of 238 Hz.

The hand-held computer indicated in FIG. 1 has a simpler clock circuit for real time, with a precision corresponding to the precision of the control circuit 106. The time instants of the measurements recorded with a stationary probe are registered therein, with intervals between the positions of the measurements normally corresponding to the length of the drill pipes (in each case 3 m). The actual measurements made with the probe stationary naturally occur during those pauses in which the probe is raised or lowered when disconnecting and adding pipe-sections respectively. (When drilling outdoors as opposed to drilling in rock cavities, such as mine drifts, the pipe sections are often joined together two-and-two, in order to save time. It is then convenient to take-up measuring points between the pipe-joining pauses.)

At the beginning of a measuring sequence, the hand-held computer is coupled to the probe in order to mutually synchronize the real-time clocks, the clock in the computer and the clock in the control circuit 106 in the probe, such that both will deliver their signals at a rate of four times per minute. After lowering of the probe has commenced, the person operating the computer presses a button, or key, immediately the drill pipe is in a measuring position, whereafter the computer signals the following fifteen-second signal and lowering of the probe can continue. When the probe has been lowered to a sufficient depth, the probe is lifted up and the measurements repeated at the same depth levels, but in the reverse order.

Subsequent to having taken up the probe, the probe is coupled to the hand-held computer and the computer fetches the measuring values from the probe memory recorded therein at said measuring time instants. (Those measurement values that have been stored in the probe and recorded as the probe moves will not be included in this case.) As before mentioned, all measurement values taken at consecutive fifteen-second intervals have been stored in the memory. The measurement values are stored in the computer together with depths and can later be used for evaluation purposes with the aid of larger computers, possibly with graphic presentations, etc., which are not described in this document since they lie outside the scope of the present invention.

A non-limiting embodiment of the invention has been described in the aforegoing. When this description is read by a person skilled in this art, he/she will realize that many variations, are possible and that the invention is solely limited by the contents of the following claims. For instance, the invention has been exemplified with the use of low frequency A.C. fields, i.e. primarily with respect to frequencies that lie in the range of 200–3000 Hz. It is quite possible from a technical aspect while using present-day technology to go down to frequencies as low as about 10 Hz, by using stronger transmitters, larger coils in the receiver and longer measuring times. When disregarding the requirement of enabling a drill bit to be fitted to the probe and used in conjunction therewith, it is quite feasible to go up in frequency to about 10 kHz, depending on how mechanically stable and electrically nonconductive the probe casing can be made.

What is claimed is:

1. A method for electromagnetically probing drill holes in geological investigations, wherein a ground-located conductor loop forming part of a transmitter arrangement is placed in the vicinity of the drill hole and a current source in the transmitter arrangement is supplied with a periodically varying electric alternating current of predetermined wave shape, and wherein a probe that has at least one sensing coil is lowered into the drill hole in order to sense signals at different levels and therewith detect variations in magnetic fields correlated with the alternating current delivered to the conductor loop, comprising the steps of:

controlling the periodicity of the electric alternating current through the conductor loop by means of a clock signal from a first clock circuit, said clock circuit being stabilized to time signals obtained from a radio connection;

the probe is electrically dependent and battery powered and includes a second, accurate clock circuit for time-bound sensing by sampling signals from said at least one sensing coil, wherewith the sampled signals are stored in a memory in the probe;

establishing the reading of the accurate clock mounted in the probe relative to the reading of the clock in the transmitter arrangement at frequent intervals, and preferably before and after each probing process, so as to take the time run by the probe clock into account; and for each level where a measurement has been made, correcting the second clock circuit to a calculated clock reading relative to the transmitter clock circuit for normalization of time to the clock of the transmitter arrangement, therein obtaining a defined phase relationship between the periodically varying alternating current in the transmitter arrangement and signals corresponding to magnetic field variations sensed in the probe.

2. A method according to claim 1, further comprising the step of deriving said time signals from GNSS satellites and calculating an accurate time signal by a circuit in the transmitter arrangement on the basis of said time signals.

3. A method according to claim 2, further comprising the steps of determining amplitude and phase position relative to the clock signals of said second clock circuit by a calculating means of the probe and therewith approximately in relation to the alternating current in the transmitting arrangement while controlled by the second clock circuit; storing the determined phase positions and amplitudes periodically and repeatedly, and registering lowering of the probe with respect to time at the location of the start of the drill hole.

4. A method according to claim 3, further comprising the steps of receiving digitized signals from said at least one sensing coil by a signal processor of the calculating means, sampling the digitized signals at a specific time interval during a period of the aforesaid periodic alternating current and determining at least two Fourier components for said signals by means of a Fast-Fourier-Transform algorithm.

5. A method according to claim 1, wherein the probe includes three fluxgate-type magnetometers that are arranged mutually perpendicularly, and three accelerometers that are also arranged mutually perpendicularly, and further comprising the step of calculating the angular position of the probe in three dimensions from the readings of said magnetometers and accelerometers and with the knowledge of the angle of inclination of the terrestrial magnetic field.

6. A method according to claim 5, further comprising the steps of determining amplitude and phase position relative to the clock signals of said second clock circuit by a calculating means of the probe and therewith approximately in relation to the alternating current in the transmitting arrangement while controlled by the second clock circuit; storing the determined phase positions and amplitudes periodically and repeatedly, and registering lowering of the probe with respect to time at the location of the start of the drill hole.

7. A method according to claim 6, further comprising the steps of receiving digitized signals from said at least one sensing coil by a signal processor of the calculating means, sampling the digitized signals at a specific time interval during a period of the aforesaid periodic alternating current and determining at least two Fourier components for said signals by means of a Fast-Fourier-Transform algorithm.

8. A method according to claim 1, wherein the probe includes three fluxgate-type magnetometers that are arranged mutually perpendicularly, and three accelerometers that are also arranged mutually perpendicularly, and further comprising the step of calculating the angular position of the probe in three dimensions from the readings of said magnetometers and accelerometers and with the knowledge of the angle of inclination of the terrestrial magnetic field.

9. A method according to claim 8, further comprising the steps of determining amplitude and phase position relative to the clock signals of said second clock circuit by a calculating means of the probe and therewith approximately in relation to the alternating current in the transmitting arrangement while controlled by the second clock circuit; storing the determined phase positions and amplitudes periodically and repeatedly, and registering lowering of the probe with respect to time at the location of the start of the drill hole.

10. A method according to claim 9, further comprising the steps of receiving digitized signals from said at least one sensing coil by a signal processor of the calculating means, sampling the digitized signals at a specific time interval during a period of the aforesaid periodic alternating current and determining at least two Fourier components for said signals by means of a Fast-Fourier-Transform algorithm.

11. A method according to claim 1, further comprising the steps of determining amplitude and phase position relative to the clock signals of said second clock circuit by a calculating means of the probe and therewith approximately in relation to the alternating current in the transmitting arrangement while controlled by the second clock circuit; storing the determined phase positions and amplitudes periodically and repeatedly, and registering lowering of the probe with respect to time at the location of the start of the drill hole.

12. A method according to claim 11, further comprising the steps of receiving digitized signals from said at least one sensing coil by a signal processor of the calculating means, sampling the digitized signals at a specific time interval during a period of the aforesaid periodic alternating current and determining at least two Fourier components for said signals by means of a Fast-Fourier-Transform algorithm.

13. A receiver arrangement for electromagnetically probing drill holes, wherein said arrangement is accommodated in an elongated casing which is dimensioned to enable it to be lowered into a drill hole and which accommodates measuring coils for sensing magnetic signals generated by a low frequency alternating current in a ground-level located transmitter loop, said receiver arrangement comprising:

an accurate sampling control clock;

three measuring coils which are essentially perpendicular to one another;

at least one sampling means for regular sampling signals from the measuring coils;

a calculating circuit for calculating the amplitude and phase position of said signals; and means for storage of sampling values, with respect to time, including a memory for storing said calculated values.

14. A receiver arrangement according to claim 13, further comprising a three-dimensional magnetometer and a three-dimensional accelerometer and means for sampling signals therefrom and storing said signals together with the samplings from the measuring coils.

15. A receiver arrangement according to claim 13, further comprising a digital signal processor which is adapted to calculate simultaneously and under the control of said accurate clock expressions which represent amplitude and phase position relative to a calculated alternating current signal approximated by means of signals from the accurate clock.

16. A receiver arrangement according to claim 13, wherein a drill bit is firmly attached to one end of the casing.

* * * * *